(12) United States Patent
Kludas et al.

(10) Patent No.: US 7,830,501 B2
(45) Date of Patent: Nov. 9, 2010

(54) SURVEYING METHOD AND SURVEYING INSTRUMENT

(75) Inventors: Torsten Kludas, Zottelstedt (DE); Michael Vogel, Schleifreisen (DE)

(73) Assignee: TRIMBLE Jena GmbH, Jena (DE)

( * ) Notice: Subject to any disclaimer, the term of this patent is extended or adjusted under 35 U.S.C. 154(b) by 303 days.

(21) Appl. No.: 12/083,653

(22) PCT Filed: Oct. 26, 2005

(86) PCT No.: PCT/EP2005/011472

§ 371 (c)(1),
(2), (4) Date: Apr. 16, 2008

(87) PCT Pub. No.: WO2007/048425

PCT Pub. Date: May 3, 2007

(65) Prior Publication Data

US 2009/0109420 A1    Apr. 30, 2009

(51) Int. Cl.
*G01B 11/26*    (2006.01)
(52) U.S. Cl. .............................. 356/139.1; 356/139.03; 356/139.04; 356/139.07
(58) Field of Classification Search .......... 356/3.01–28
See application file for complete search history.

(56) References Cited

U.S. PATENT DOCUMENTS

| 4,841,460 | A  | 6/1989  | Dewar et al. |
| 6,310,644 | B1 | 10/2001 | Keightley |
| 6,594,600 | B1 | 7/2003  | Arnoul et al. |
| 7,075,634 | B2 | 7/2006  | Uezono et al. |
| 7,098,997 | B2 | 8/2006  | Shirai et al. |
| 7,218,384 | B2 | 5/2007  | Shirai et al. |
| 2005/0069195 | A1* | 3/2005 | Uezono et al. .............. 382/154 |

FOREIGN PATENT DOCUMENTS

| DE | 10308525 | 9/2003 |
| DE | 10329341 | 1/2004 |
| DE | 10328828 | 4/2004 |
| EP | 1139062  | 10/2001 |
| JP | 08285585 | 11/1996 |
| JP | 09126772 | * 5/1997 |

OTHER PUBLICATIONS

English language abstract of German Patent Publication No. DE 10308525, published Sep. 4, 2003, esp@cenet database.

(Continued)

*Primary Examiner*—Thomas H Tarcza
*Assistant Examiner*—Luke D Ratcliffe
(74) *Attorney, Agent, or Firm*—Cooper & Dunham LLP

(57) ABSTRACT

A surveying method using a the video total station comprises placing the video total station on a first platform, recording a first image of scenery, placing the video total solution on a second platform disposed at a distance from the first platform, measuring the distance from the first platform and recording a second image of the scenery. Three-dimensional coordinates of objects contained in the images are determined by a photogrammetric analysis of the images based on the measured distance. Further, orientations of the video total station can be recorded when taking the images and when measuring the distance.

24 Claims, 7 Drawing Sheets

OTHER PUBLICATIONS

English language abstract of German Patent Publication No. DE 10328828, published Apr. 29, 2004, esp@cenet database.
English language abstract of German Patent Publication No. DE 10329341, published Jan. 22, 2004, esp@cenet database.
English language automated translation of Japan Patent Publication No. JP 08 285585, published Nov. 1, 1996, Japanese Patent Office website.
"GPT-7000i Series", 2 pages, Information for Topcon product, 2004.

* cited by examiner

SURVEYING METHOD AND SURVEYING INSTRUMENT

BACKGROUND OF THE INVENTION

1. Field of the Invention

The present invention generally relates to a surveying method and a surveying instrument. The invention also relates to a computer program product causing the surveying instrument to perform the surveying method. In particular, the present invention relates to those surveying instruments and methods for performing photogrammetry, i.e. obtaining three-dimensional data of objects from plural images recorded from different positions.

2. Brief Description of Related Art

A conventional photogrammetric method uses a camera for obtaining two images of a scenery from two different locations. A surveying instrument which is separate from the camera and allowing to measure angles and distances is located spaced apart from the two locations of the camera, for determining the relative positions of the two locations from which the two images are taken. From an analysis of the two images and based on the information of the relative position of the two camera locations it is possible to obtain three-dimensional data of objects contained in the scenery.

A further conventional photogrammetric method in which two images of a scenery are obtained from different locations uses plural targets having predetermined distances from each other disposed in the scenery. The predetermined targets can be located in the obtained images and allow a determination and corrects scaling of three-dimensional data of other objects contained in the scenery.

The necessity of determining the two camera locations with a separate instrument located at a suitable distance from both camera locations or the necessity of locating predetermined targets within the scenery is burdensome, and also a source of measurement errors.

SUMMARY OF THE INVENTION

The present invention has been accomplished taking the above problems into consideration.

Embodiments of the present invention provide a method of obtaining plural images for photogrammetric analysis, using a surveying instrument comprising a camera, and without the necessity of determining relative camera positions with a separate instrument or arranging predetermined targets close to measured objects.

Embodiments of the present invention use a surveying instrument comprising a distance measuring system for determining a distance from an object along a measuring line; a camera fixedly mounted relative to the distance measuring system; a swivel arrangement rotatably mounting the distance measuring system and the camera relative to a base; and an orientation measuring system for determining an orientation of the distance measuring system and the camera relative to the base. Such surveying instrument is also referred to as video total station in the art.

Using such surveying instrument, an embodiment of the surveying method according to the present invention comprises: placing a first platform relative to a scenery; mounting the surveying instrument on the first platform and, while the surveying instrument is mounted on the first platform: orienting the distance measuring system and the camera relative to the base in a first orientation, and recording a first image of the scenery using the camera; placing a second platform relative to the scenery such that the second platform is disposed at a distance from the first platform; and mounting the surveying instrument on the second platform and, while the surveying instrument is mounted on the second platform: orienting the distance measuring system and the camera relative to the base in a second orientation and recording a second image of the scenery using the camera; and orienting the distance measuring system and the camera relative to the base in a third orientation such that the measuring line intersects a predetermined first object provided on the first platform and measuring a first distance from the first object provided on the first platform using the distance measuring system, and recording the measured first distance.

The platform may be any suitable platform allowing a well-defined and reproducible mounting of the surveying instrument thereon. In particular, the platform may comprise a tripod.

According to exemplary embodiments of the invention, the object provided on the first platform is a retro-reflector.

According to other embodiments, the object may be a conventional target mark used in the art or any other suitable structure allowing to be detected and tracked by the distance measuring system and which can be reproducibly mounted on the platform.

According to exemplary embodiments of the invention, the first platform can receive either of the surveying instrument or the first object, and the first object is precisely and reproducibly mountable on this platform.

According to this embodiment of the invention, one person may readily obtain two or more images of the scenery while using only one single surveying instrument and two platforms. No other separate and independent surveying instrument or predefined targets located within the scenery are necessary.

The first and second recorded images are suitable for a photogrammetric analysis and, in particular, for a stereo-analysis. Since the distance between the two platforms and, thus, the distance between the two locations from where the first and second images were recorded, are precisely measured, it is possible to determine three-dimensional coordinates of objects contained in the scenery in a suitable coordinate system. The coordinate system may be fixed to the camera location from where the first or second image was recorded, or any other suitable coordinate system may be chosen.

The photogrammetric analysis may include a selection of at least one object in both images. The selection may be performed by the user shortly after the second image was recorded. For example, the user may select the object on a flat screen display of the surveying instrument by using a mouse cursor or any other suitable pointing device or method. It is also possible that the selection of the objects is performed off-line, i.e. at a computer disposed at a distance from the measuring location after transfer of the recorded images and recorded additional measurement data, such as the first distance, to this computer.

According to embodiments of the invention, the method further comprises: orienting the distance measuring system and the camera relative to the base in a fourth orientation such that the measuring line intersects a predetermined second object provided on the second platform and measuring a second distance from the second object provided on the second platform using the distance measuring system and recording the measured second distance, while the distance measuring system is mounted on the first platform. This requires the user to place the second object on the second platform, but has the advantage that the distance between the two camera locations is determined by a second measurement, such that an improved photogrammetric analysis of the recorded images can be carried out.

According to an embodiment herein, the first orientation of the camera relative to the base while recording the first image is measured, using the orientation measuring system, and recorded. Also the fourth orientation of the distance measuring system pointing to the object on the second platform is measured and recorded. This additional recorded information may be used in the photogrammetric analysis since it represents the orientation of the camera recording the first image relative to the location of the camera recording the second image. This may increase the redundancy of the photogrammetric analysis and, thus, improve the accuracy of the photogrammetric analysis.

According to a further exemplary embodiment, the method comprises measuring the second orientation of the camera when recording the second image, recording the measured second orientation, and measuring the third orientation of the distance measuring system when pointing to the first platform, and recording the measured third orientation. This additional information provided by the recorded second orientation and third orientation represents the orientation of the camera, when recording the second image, relative to the location of the camera when recording the first image. This information may also increase the redundancy of the photogrammetric analysis and improve an accuracy thereof.

The term recording as used herein means any storage or transmission of measuring data, such as an image, a distance and an orientation, for later reuse. For example, an output signal of an angle measuring device of the surveying instrument may be periodically sampled, and the sampled signals are discarded except for one signal representing a desired measured signal which was sampled shortly after a user input. Further, the recording of the desired measurement data may also include a continuous recording of all output signals periodically provided by a sensor on a large storage device, wherein an additional recorded signal, such as a data address, allows to identify a particular desired measurement data for later reuse.

Embodiments of the present invention provide a surveying instrument comprising a distance measuring system for determining a distance from an object along a measuring line; a camera fixedly mounted relative to the distance measuring system; a swivel arrangement rotatably mounting the distance measuring system and the camera relative to a base; an orientation measuring system for determining an orientation of the distance measuring system and the camera relative to the base; and a processing unit configured to perform a procedure comprising: receiving a first confirmation from a user that the surveying instrument is mounted on a first platform and that the distance measuring system and the camera are oriented relative to the base in a first orientation pointing to a scenery; recording a first image of the scenery using the camera upon receipt of the first confirmation; receiving a second confirmation from a user that the surveying instrument is mounted on a second platform and that the distance measuring system and the camera are oriented relative to the base in a second orientation pointing to the scenery; recording a second image of the scenery using the camera upon receipt of the second confirmation; receiving a third confirmation from a user that the surveying instrument is mounted on the second platform and that the distance measuring system and the camera are oriented relative to the base in a third orientation such that the measuring line intersects a predetermined first object provided on the first platform, and measuring a first distance from the first object provided on the first platform using the distance measuring system, and recording the measured first distance upon receipt of the third confirmation.

Further embodiments of the invention provide a computer-readable carrier containing information representing a computer program adapted to cause a processing unit of a surveying instrument to execute the above illustrated surveying method.

BRIEF DESCRIPTION OF THE DRAWINGS

The foregoing as well as other advantageous features of the invention will be more apparent from the following detailed description of exemplary embodiments of the invention with reference to the accompanying drawings. It is noted that not all possible embodiments of the present invention necessarily exhibit each and every, or any, of the advantages identified herein.

DETAILED DESCRIPTION OF EXEMPLARY EMBODIMENTS

Figure 1:
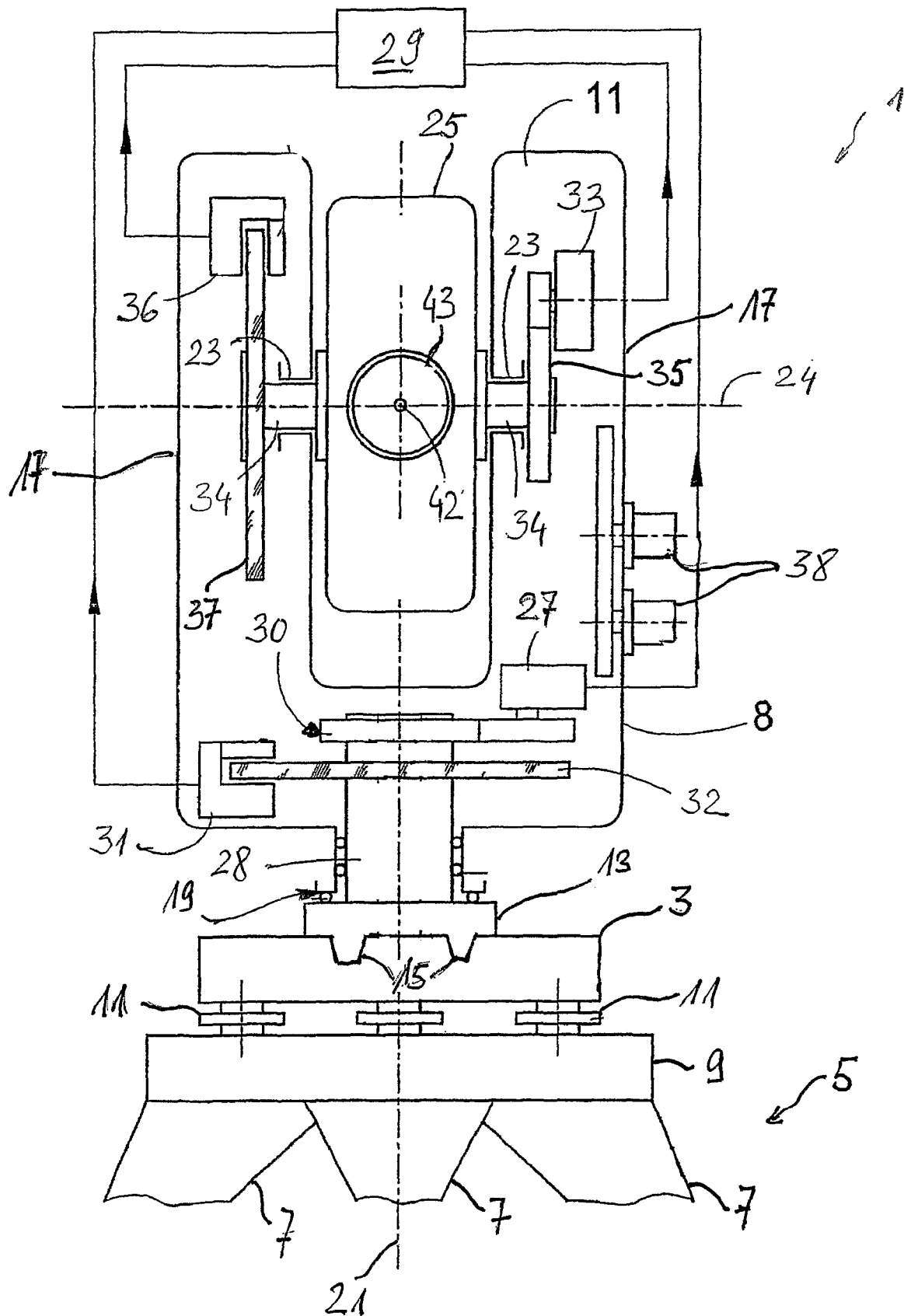
FIG. 1 illustrates a surveying instrument according to an embodiment of the invention.

In the exemplary embodiments described below, components that are alike in function and structure are designated as far as possible by alike reference numerals. Therefore, to understand the features of the individual components of a specific embodiment, the descriptions of other embodiments and of the summary of the invention should be referred to.

FIG. 1 is an illustration of a surveying instrument which may be used according to embodiments of the invention. The surveying instrument 1 is a video tacheometer or video total station mounted on a platform 3 of a tripod 5. The tripod 5 comprises three legs 7 attached to a plate 9. The platform 3 is mounted on the plate 9 by three screws 11 allowing leveling of the platform 3 relative to a ground on which the legs are placed.

The surveying instrument 1 has a base 13 attached to the platform 3 in a predetermined and reproducible position by a positioning mechanism comprising such as cone-shaped projections 15 received in corresponding recessions provided in the platform 3 and fixed to the platform 3 by a fixing mechanism (not shown in FIG. 1).

The base 13 carries a swivel arrangement comprising a pair of brackets 17 mounted on the base 13 by a bearing arrangement 19 such that the pair of brackets 17 is rotatable relative to the base 13 and platform 3 about a vertical axis 21. A bearing 23 is provided in each of the brackets 17 to define a common horizontal axis 24 about which an optical measuring system 25 is rotatable.

A motor arrangement 27 carried by the brackets 17 engages with a pin 28 fixed to the base 13 through a gear train 30 for rotating the measuring system 25 about the vertical axis 21 by actuation of the motor arrangement 27 controlled by a processing unit 29 of the surveying instrument 1.

An orientation of the measuring system 25 about the vertical axis 21 is detected by a sensor 31 reading an angular position relative to an encoder disk 32 fixed to the pin 28.

Orientation measuring signals generated by the sensor 31 are supplied to the processing unit 29.

A motor arrangement 33 carried by the brackets 17 engages with an axis 34 of the optical measuring system 25 through a gear train 35 for rotating the measuring system 25 about the horizontal axis 24 by actuation of the motor arrangement 33 controlled by the processing unit 29.

An orientation of the measuring system 25 about the horizontal axis 24 is detected by a sensor 36 reading an angular position relative to an encoder disk 37 fixed to the axis 34. Orientation measuring signals generated by the sensor 36 are supplied to the processing unit 29.

Control knobs 38 operable by a user are provided on an outer surface of one of the brackets 17 for instructing the processing unit 29 to perform swivel movements of the optical measuring system about the vertical and horizontal axes 21, 24.

Figure 2:
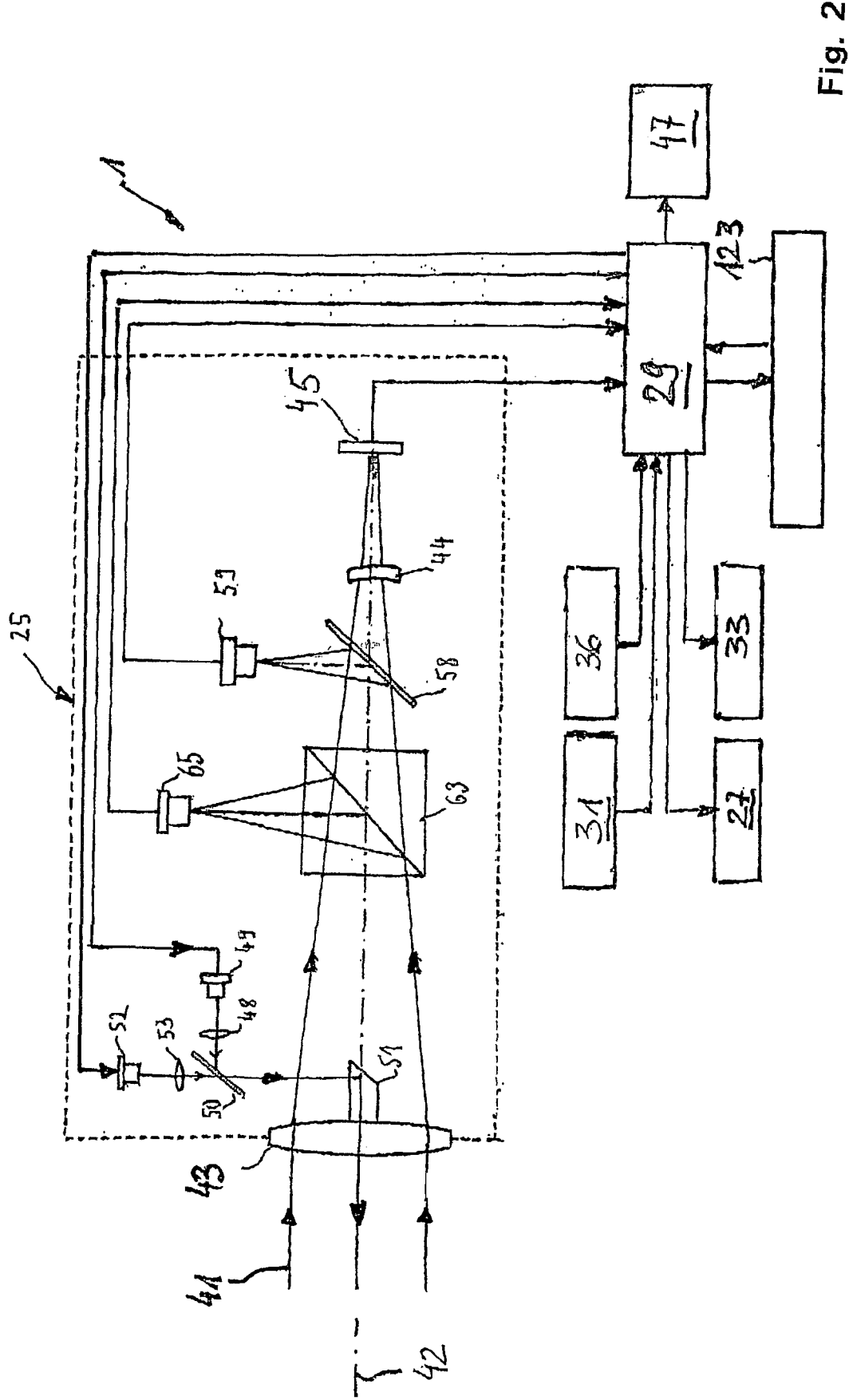
FIG. 2 is a functional diagram of the surveying instrument shown in FIG. 1.
Figure 3:
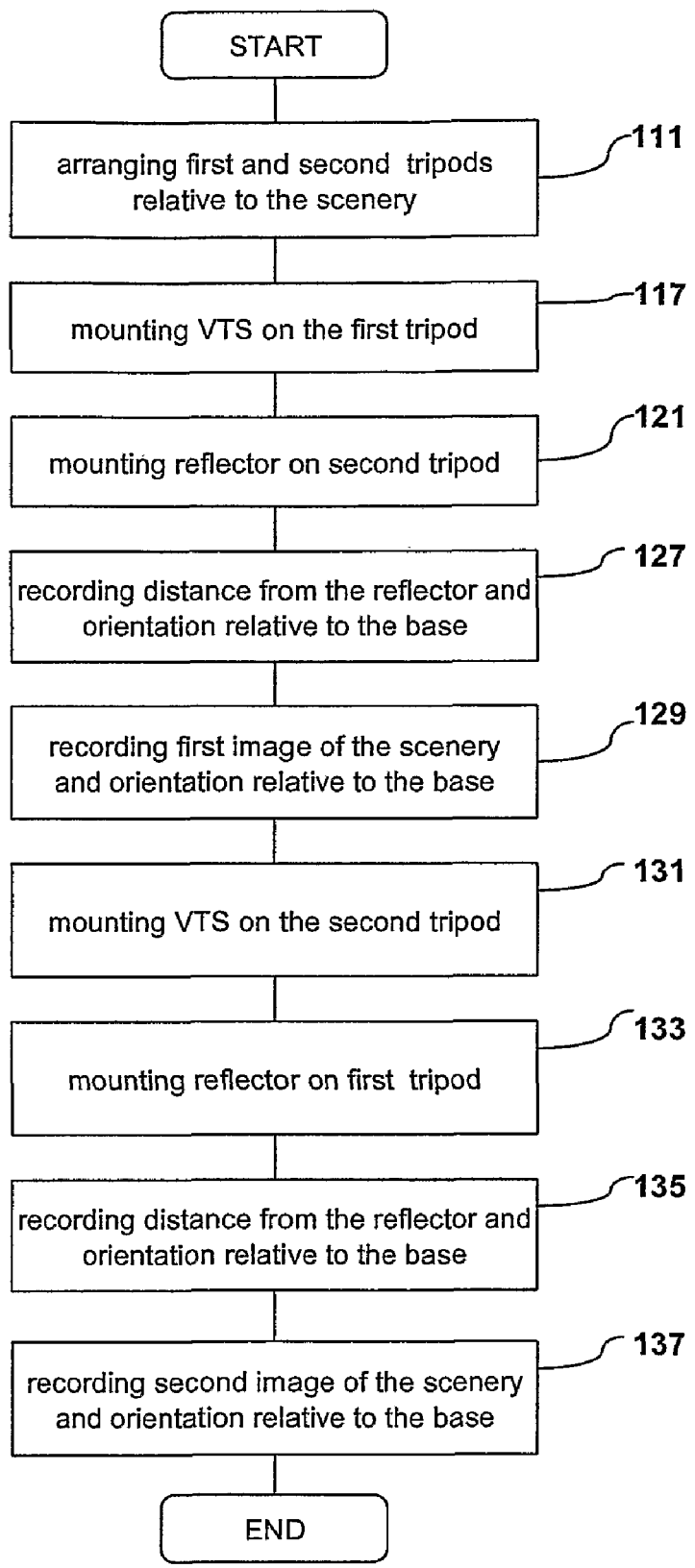
FIG. 3 is a flowchart illustrating a surveying method according to an embodiment of the invention.

A functional diagram of the measuring system 25 is illustrated in FIG. 2. The measuring system 25 comprises a distance measuring system and a camera, both using common optical elements in their beam paths. Light 41 emitted from a scenery enters the optical system 25 through an objective lens 43 to image the scenery onto a CCD camera element 45 via a focusing lens 44. Image data obtained by the CCD camera element 45 are supplied to the processing unit 29 of the surveying instrument 1. The processing unit 29 generates an image representing the scenery detected by the camera 45 from the image data and displays the image representation on a display 47 of the surveying instrument 1. The processing unit is also adapted to store the image data in a memory 123.

The optical system 25 further comprises a distance measuring system comprising a light emitting element 49, such as an infrared LED, a condensing lens 48 for condensing distance measuring light emitted by the light emitting element 49, a dichroitic mirror 50 for reflecting the condensed light towards a reflection prism 51 such that the light is emitted through the objective lens 43 along an optical axis 42 extending through the objective lens 43 and focusing lens 44.

The optical system 25 further comprises an illumination unit comprising a light source 52, such as an LED, for emitting illumination light, a condensing lens 53 for condensing the illumination light emitted by the light source 52 in a direction towards the reflection prism 51 such that also the illumination light is emitted through the objective lens 43 along the optical axis 42.

Illumination light reflected from a target enters the optical system 25 through the objective lens 43, is reflected from a semi-transparent mirror 58 and is incident on a detector 59 having four sector detector elements to generate a position signal supplied to the processing unit 29. The processing unit controls the motors 27 and 33 such that the position signal is optimized such that the four detector elements 59 receive a substantially equal light intensity. This indicates that the optical axis 42 representing a measuring line of the distance measuring system is directed to the reflecting target.

Distance measuring light generated by the light emitting element 49 and reflected from the target enters the optical system 25 through the objective lens 43 and is reflected from a dichroitic prism 63 to be incident on a light receiving element 65 generating an output signal which is indicative of a distance of the measuring system 25 from the reflecting target. The distance from the target may be calculated by evaluating a phase error between a light intensity emitted by the light emitting element 49 and an intensity received by the detector 65, or by any other optical distance measuring method-well known in the art.

A surveying method using the surveying instrument 1 is illustrated with reference to FIGS. 3 to 7 below.

It is assumed that it is an object of the method to calculate three-dimensional coordinates of object portions of a scenery which is a house 101 in the present example. The object portions of interest comprise corners 103 of windows, corners 105 of a wall and a top 107 of a roof of the house 101.

In a first step 111, a first tripod 5' and a second tripod 5" are placed each at a distance from the house 101 and at a distance from each other. The platforms 3 of the tripods 5', 5" are leveled by the screws 11 to be horizontal and to provide a vertical orientation of the axis 21 when the surveying instrument 1 is mounted on the platforms 3.

The surveying instrument 1 is then mounted by the user on the first tripod 5' in a step 117, and a retro-reflecting prism 119 is mounted on the platform 3 of the second tripod 5" in a step 121. The retro-reflecting prism 119 is mounted on a base 120 having the same cone-shaped projections 15 as the base 13 of the surveying instrument 1, such that the retro-reflector can be precisely and reproducibly mounted on the platform 3 of the tripods 5' and 5".

Figure 4:
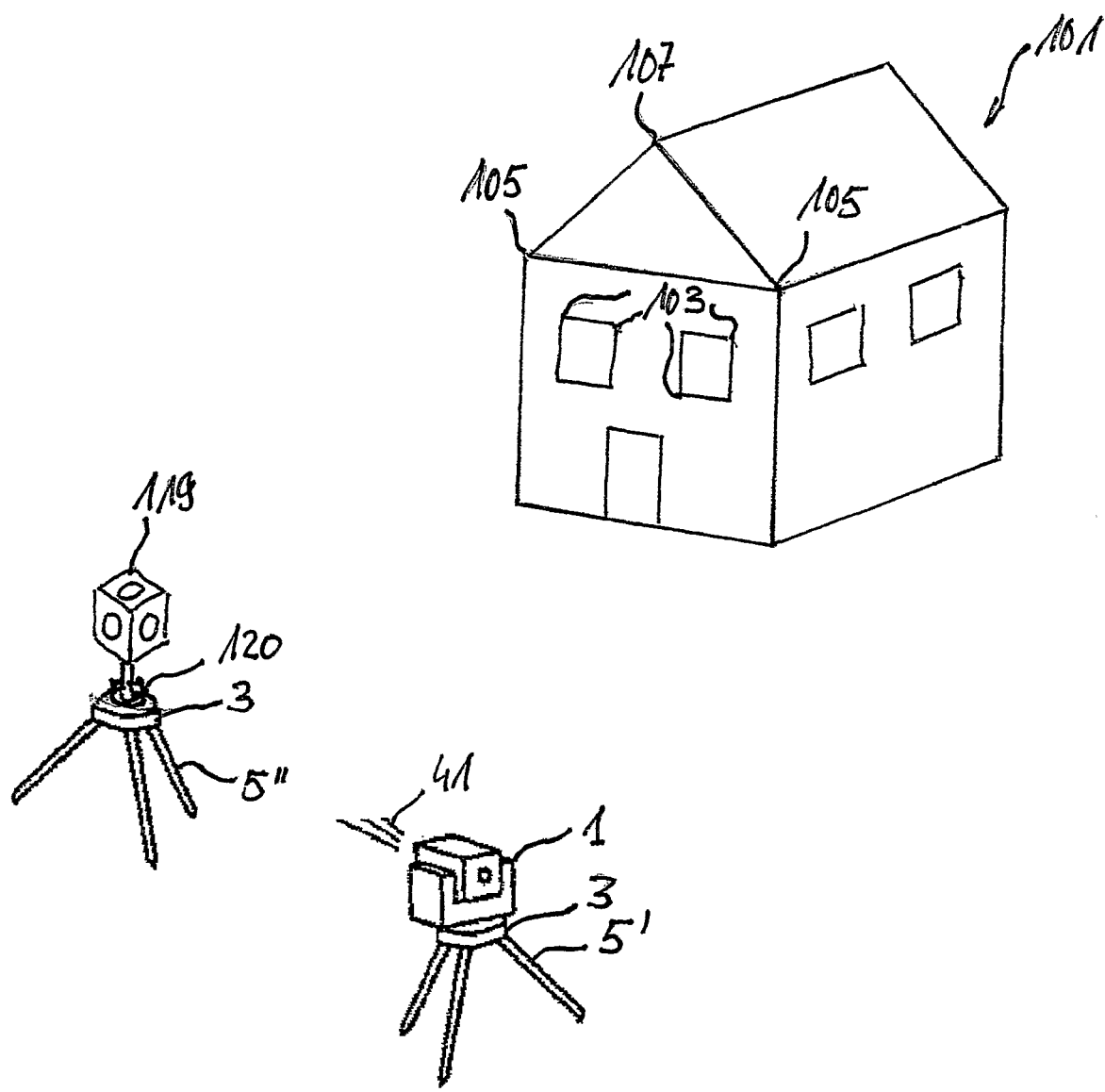
FIG. 4.

The measuring optics 25 of the surveying instrument 1 is oriented such that the measuring line or optical axis 42 is directed towards the retro-reflector 119. A measuring program stored in the memory 123 associated with the processing unit 29 is then started by the user. The program displays a first dialog on the display 47 requesting the user to confirm that the retro-reflector 119 is placed on the second tripod 5", the surveying instrument 1 is placed on the first tripod 5' and oriented towards the retro-reflector 119. Upon confirmation of this dialog, the processing unit 29 carries out a procedure to precisely orient the measuring line 42 to intersect a point of reflection of the retro-reflector 119 by operating the motors 27 and 33 based on readings of the detector 59. Thereafter, the distance from the retro-reflector 119 is determined from readings of the sensor 65. The distance from the retro-reflector 119 and angular positions about the vertical and horizontal axes 21 and 24 as detected by the sensors 31 and 36 are recorded in the memory 123 in a step 127. The configuration of the surveying instrument 1 and the retro-reflector 119 relative to the house 101 in step 127 is shown in FIG. 4.

Figure 5:
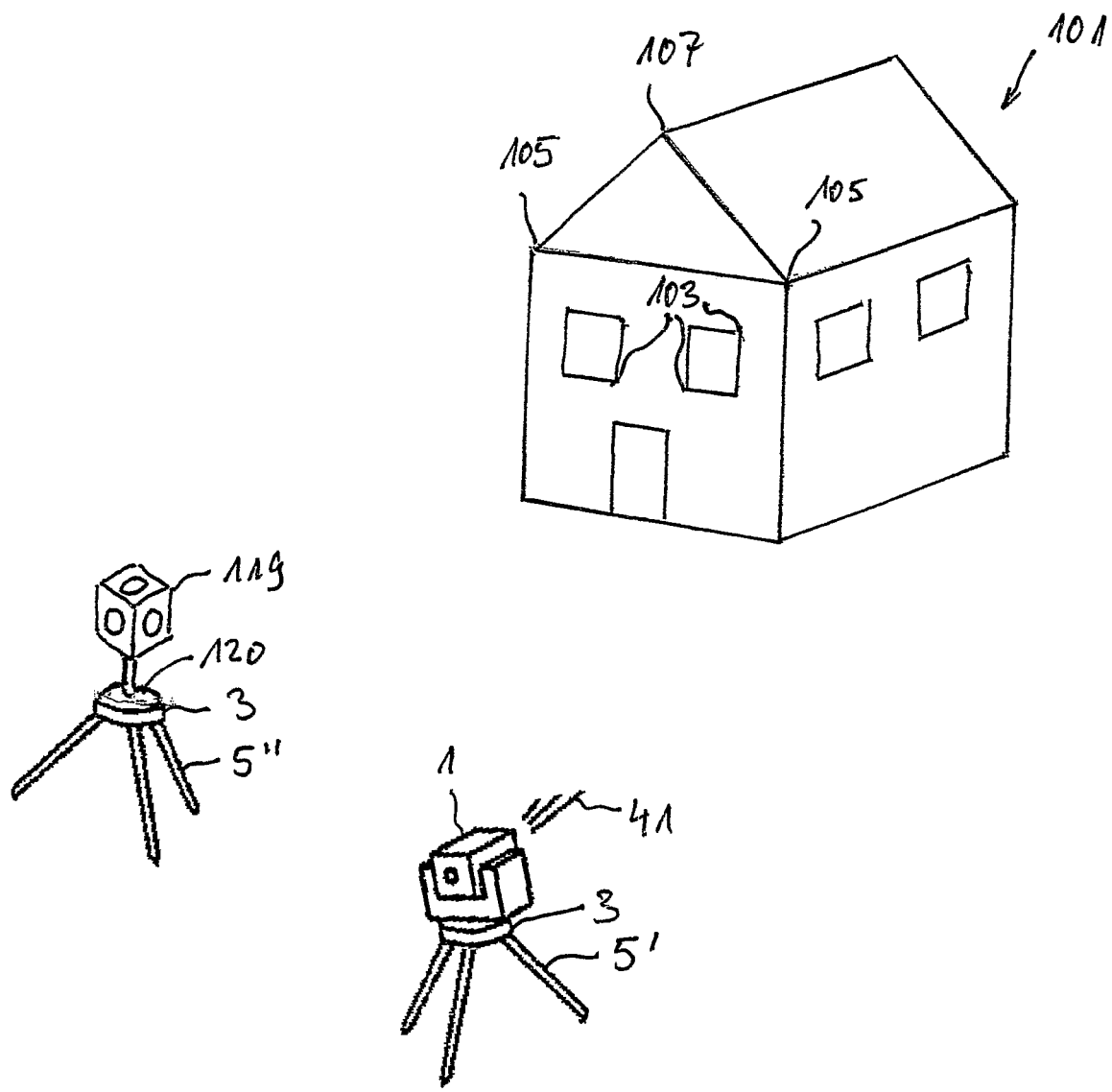
FIG. 5.

Thereafter, the processing unit 29 displays a dialog requesting the user to confirm that the surveying instrument 1 mounted on the first tripod 5' is directed towards the scenery 101 of interest. The user may then orient the optical system 25 of the surveying instrument 1 such that a significant portion of the house 101 is detected by the camera 45 as illustrated in FIG. 5. Upon confirmation of the dialog, the processing unit stores, in a step 129, image data detected by the CCD camera 45 in the memory 123, together with the detected orientation about axes 21 and 24.

The processing unit 29 may then display a further dialog allowing the user to decide whether further images should be recorded from the location of the first tripod 5' or whether the user intends to proceed to the next major step of the procedure. This allows the user to record further images to increase redundancy of the obtained data and to cover larger sceneries which cannot be covered by one single image.

Upon deciding to proceed forward to the next major step, the user carries the surveying instrument 1 to the location of the second tripod 5", removes the retro-reflector 119 from the second tripod 5" and mounts the surveying instrument on the second tripod 5" in a step 131. The user may further mount the retro-reflector 119 on the first tripod 5' in a step 133.

Figure 6:
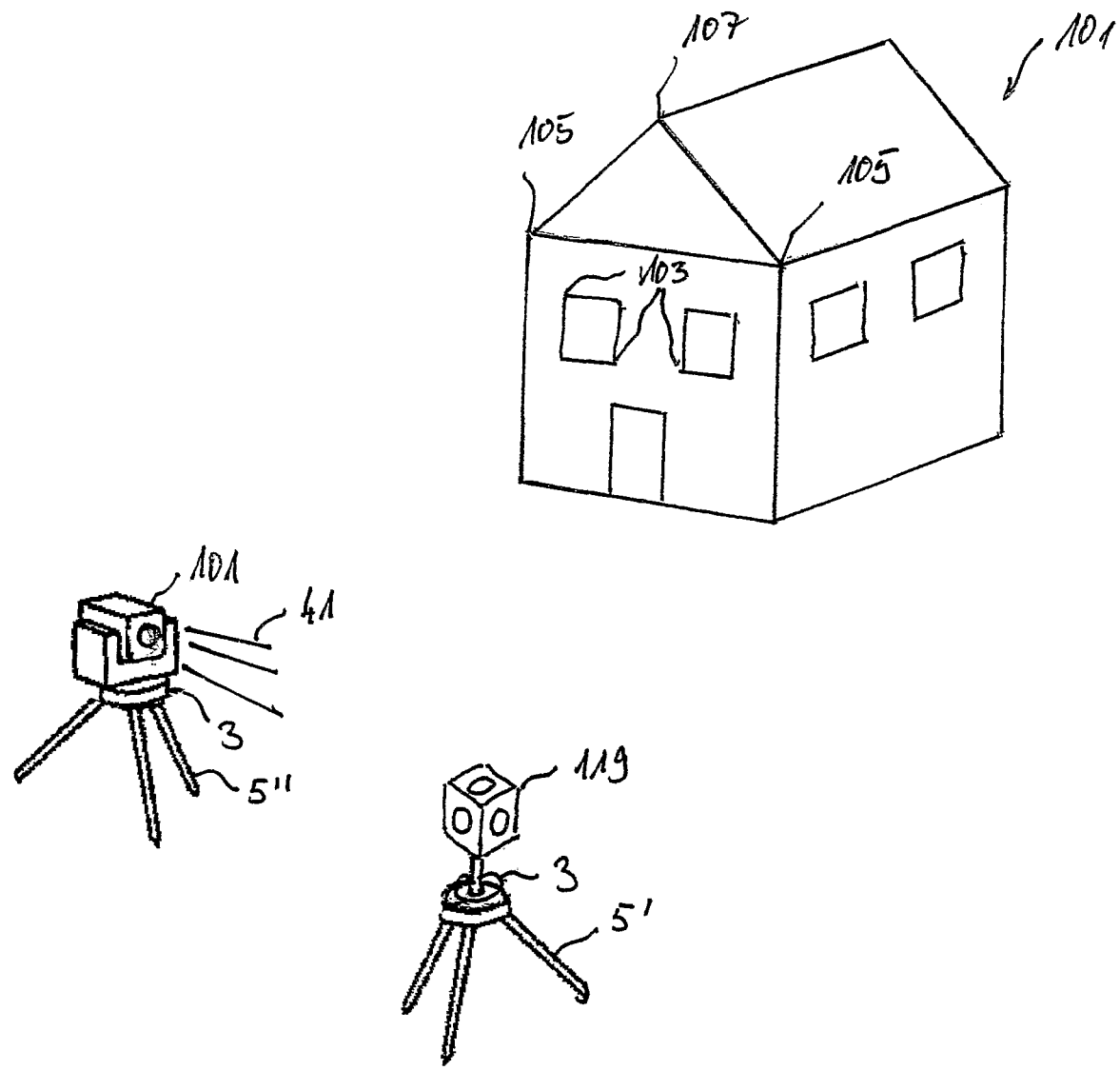
FIG. 6.

In the meantime, the processing unit 29 displays a further dialog requesting the user to confirm that the retro-reflector 119 is mounted on the first tripod 5', that the surveying instrument 1 is mounted on the second tripod 5" and oriented towards the retro-reflector 119, as shown in FIG. 6. Upon confirmation, the processing unit 29 measures, in a step 135, the distance from the retro-reflector 119 and records the distance and orientation of the optical axis relative to the base 13 according to a same processing as illustrated above with reference to step 127.

Figure 7:
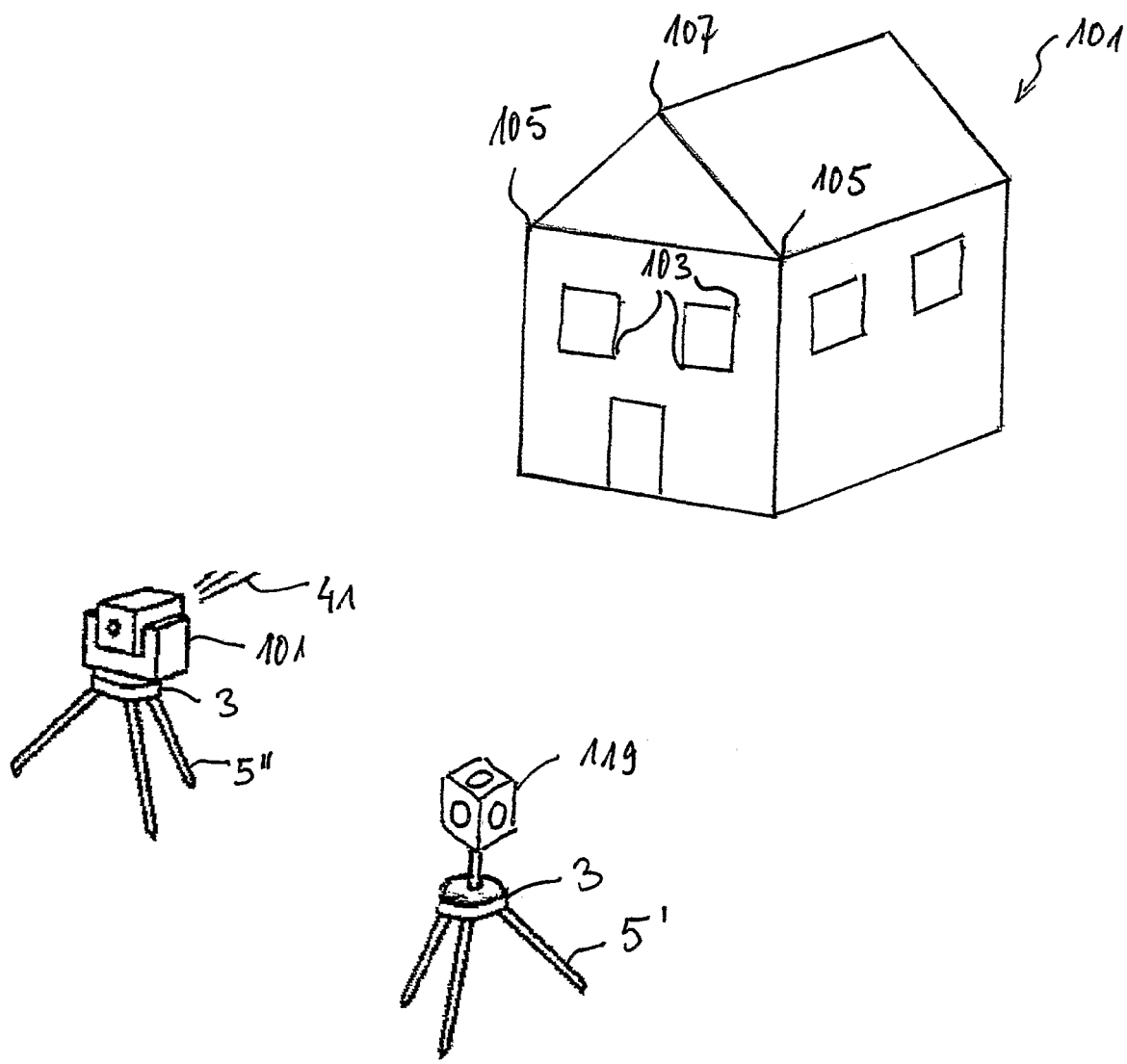
FIG. 7 are illustrations of measuring situations in the surveying method illustrated in FIG. 4.

Thereafter, the user may orient the measuring instrument towards the house 101 and confirm a dialog displayed by the processing unit 29 requesting the user to indicate that the surveying instrument is directed towards objects of interest, as illustrated in FIG. 7.

Thereafter, the processing unit stores image data obtained from the CCD camera 45 in the memory 123 together with orientations of the measuring optics 25 about the vertical and horizontal axis 21 and 24, in a step 137.

The processing unit may then ask the user whether further images should be recorded to increase redundancy or cover extended sceneries which cannot be imaged by one single image, or whether the procedure should be terminated.

The user may then continue to record further images of the house 101 from a third location by placing the first tripod 5' at that third location, measuring the distance of the surveying instrument 1 on the second tripod 5" from the first tripod 5' and proceeding by mounting the surveying instrument 1 on the first tripod at the third location and recording one or more images of the house from the third location. This process may be continued with taking further images from any number of more locations to improve the redundancy of the obtained data and increasing the accuracy of the photogrammetric analysis.

After recording the last images of the building 101, the user may perform a photogrammetric analysis of the recorded images using the processing unit 29 of the surveying instrument 1, or the user may transfer the recorded data to another computer, such as a desktop computer, by connecting the surveying instrument to the desktop computer through a cable network or wireless network or other. The processing may include identifying at least one object in the images, such as the edges 103 of the windows of the house 101, using a pointing device such as a mouse cursor. It is also possible that a suitable software performs an analysis of the recorded images and automatically identifies significant objects by a similarity analysis between different images. If two or more objects are identified in a pair of images taken from the first and second tripod positions, the analyzing software may compute three-dimensional coordinates of these objects in an arbitrary coordinate system, since the distance between the two camera positions from where the images were taken was precisely measured in one or both of the steps 127 and 135. In this respect, one of the steps 127 and 135 is optional. Also, the recording of the orientations relative to the reflector in the steps 127 and 135 is optional. However, the recording of the orientations in the steps 127 and 135 together with the recording of the orientations in the steps 129 and 137 has the advantage of an increased accuracy of the image analysis.

In the illustration of the surveying instrument given above with reference to FIG. 2 it was assumed that the optical axis of the objective lens 42 and adapter lens 44 coincides with the measuring line defined by the objective lens 43, mirror 58 and four sector detector elements 59. In practice, the measuring line and optical axis will slightly deviate from each other. However, such deviation can be calibrated and stored as additional data associated with the measuring instrument in the memory 123.

Further, the above illustration with reference to FIG. 1 assumes that the optical axis 42, the vertical axis 21 and the horizontal axis 24 intersect at orthogonal angles in one point. In practice, however, the axes will not intersect exactly in one point, and the axes are also not exactly orthogonally aligned with respect to each other. Such deviation can be calibrated and also stored as calibration data in the memory 123. The calibration data can then be used in the image analysis to improve the accuracy thereof.

While the invention has been described with respect to certain exemplary embodiments thereof, it is evident that many alternatives, modifications and variations will be apparent to those skilled in the art. Accordingly, the exemplary embodiments of the invention set forth herein are intended to be illustrative and not limiting in any way. Various changes may be made without departing from the spirit and scope of the present invention as defined in the following claims.

What is claimed is:

1. A surveying method using a surveying instrument, the surveying instrument comprising:
   a distance measuring system for determining a distance from an object along a measuring line;
   a camera fixedly mounted relative to the distance measuring system;
   a swivel arrangement rotatably mounting the distance measuring system and the camera relative to a base; and
   an orientation measuring system for determining an orientation of the distance measuring system and the camera relative to the base;
   the method comprising:
   placing a first platform relative to a scenery;
   mounting the surveying instrument on the first platform and, while the surveying instrument is mounted on the first platform:
      orienting the distance measuring system and the camera relative to the base in a first orientation, and recording a first image of the scenery using the camera;
   placing a second platform relative to the scenery such that the second platform is disposed at a distance from the first platform; and
   mounting the surveying instrument on the second platform and, while the surveying instrument is mounted on the second platform:
      orienting the distance measuring system and the camera relative to the base in a second orientation and recording a second image of the scenery using the camera; and
      orienting the distance measuring system and the camera relative to the base in a third orientation such that the measuring line intersects a predetermined first object provided on the first platform and measuring a first distance from the first object provided on the first platform using the distance measuring system, and recording the measured first distance.

2. The surveying method according to claim 1, further comprising: identifying at least one object in each of the recorded first image and the recorded second image, and determining three-dimensional coordinates of the at least one object in a coordinate system.

3. The surveying method according to claim 2, wherein the determining of the three-dimensional coordinates of the at least one object is based on positions of the objects within the recorded first and second images, and the recorded first distance.

4. The surveying method according to claim 1, wherein the first object is a first retro-reflector.

5. The surveying method according to claim 4, further comprising: removing the surveying instrument from the first platform, and mounting the first retro-reflector on the first platform thereafter.

6. The surveying method according to claim 1, further comprising, while the distance measuring system is mounted on the first platform:
orienting the distance measuring system and the camera relative to the base in a fourth orientation such that the measuring line intersects a predetermined second object provided on the second platform and measuring a second distance from the second object provided on the second platform using the distance measuring system, and recording the measured second distance.

7. The surveying method according to claim 1, further comprising, while the distance measuring system is mounted on the second platform:
measuring the second orientation using the orientation measuring system, and recording the measured second orientation; and
measuring the third orientation using the orientation measuring system, and recording the measured third orientation.

8. The surveying method according to claim 7, further comprising, while the distance measuring system is mounted on the first platform:
measuring the first orientation using the orientation measuring system and recording the measured first orientation; and
measuring the fourth orientation using the orientation measuring system, and recording the measured fourth orientation.

9. The surveying method according to claim 8, further comprising: identifying at least one object in each of the recorded first image and the recorded second image, and determining three-dimensional coordinates of the at least one object in a coordinate system, based on positions of the objects within the recorded first and second images, the recorded first, second, third and fourth orientations, and the recorded first distance.

10. The surveying method according to claim 1, wherein the second object is a second retro-reflector.

11. The surveying method according to claim 10, further comprising: removing the second retro-reflector from the second platform before the mounting of the surveying instrument on the second platform is performed.

12. The surveying method according to claim 1, wherein at least one of the first and second platforms comprises a tripod.

13. A computer-readable carrier containing information representing a computer program adapted to cause a processing unit of a surveying instrument to perform a procedure, wherein the surveying instrument comprises:
a distance measuring system for determining a distance from an object along a measuring line;
a camera fixedly mounted relative to the distance measuring system;
a swivel arrangement rotatably mounting the distance measuring system and the camera relative to a base; and
an orientation measuring system for determining an orientation of the distance measuring system and the camera relative to the base;
and wherein the procedure comprises:
receiving a first confirmation from a user that the surveying instrument is mounted on a first platform and that the distance measuring system and the camera are oriented relative to the base in a first orientation pointing to a scenery;
recording a first image of the scenery using the camera upon receipt of the first confirmation;
receiving a second confirmation from a user that the surveying instrument is mounted on a second platform and that the distance measuring system and the camera are oriented relative to the base in a second orientation pointing to the scenery;
recording a second image of the scenery using the camera upon receipt of the second confirmation;
receiving a third confirmation from a user that the surveying instrument is mounted on the second platform and that the distance measuring system and the camera are oriented relative to the base in a third orientation such that the measuring line intersects a predetermined first object provided on the first platform, and measuring a first distance from the first object provided on the first platform using the distance measuring system, and recording the measured first distance upon receipt of the third confirmation.

14. The computer-readable carrier according to claim 13, wherein the procedure further comprises:
receiving a fourth confirmation from the user that the surveying instrument is mounted on the first platform and that the distance measuring system and the camera are oriented relative to the base in a fourth orientation such that the measuring line intersects a predetermined second object provided on the second platform.

15. The computer-readable carrier according to claim 14, wherein the procedure further comprises:
measuring a second distance from the second object provided on the second platform using the distance measuring system, and recording the measured second distance upon receipt of the fourth confirmation.

16. The computer-readable carrier according to claim 15, wherein the procedure further comprises:
measuring the fourth orientation using the orientation measuring system and recording the measured fourth orientation upon receipt of the fourth confirmation; and
measuring the first orientation using the orientation measuring system and recording the measured first orientation upon receipt of the first confirmation.

17. The computer-readable carrier according to claim 13, wherein the procedure further comprises:
measuring the second orientation using the orientation measuring system and recording the measured second orientation upon receipt of the second confirmation; and
measuring the third orientation using the orientation measuring system and recording the measured third orientation upon receipt of the third confirmation.

18. A surveying instrument, comprising:
a distance measuring system for determining a distance from an object along a measuring line;
a camera fixedly mounted relative to the distance measuring system;
a swivel arrangement rotatably mounting the distance measuring system and the camera relative to a base;
an orientation measuring system for determining an orientation of the distance measuring system and the camera relative to the base; and
a processing unit configured to perform a procedure comprising:
receiving a first confirmation from a user that the surveying instrument is mounted on a first platform and that the distance measuring system and the camera are oriented relative to the base in a first orientation pointing to a scenery;

recording a first image of the scenery using the camera upon receipt of the first confirmation;

receiving a second confirmation from a user that the surveying instrument is mounted on a second platform and that the distance measuring system and the camera are oriented relative to the base in a second orientation pointing to the scenery;

recording a second image of the scenery using the camera upon receipt of the second confirmation;

receiving a third confirmation from a user that the surveying instrument is mounted on the second platform and that the distance measuring system and the camera are oriented relative to the base in a third orientation such that the measuring line intersects a predetermined first object provided on the first platform, and measuring a first distance from the first object provided on the first platform using the distance measuring system, and recording the measured first distance upon receipt of the third confirmation.

19. The surveying instrument according to claim 18, wherein the processing unit is configured to perform the procedure which further comprises:

receiving a fourth confirmation from the user that the surveying instrument is mounted on the first platform and that the distance measuring system and the camera are oriented relative to the base in a fourth orientation such that the measuring line intersects a predetermined second object provided on the second platform.

20. The surveying instrument according to claim 19, wherein the processing unit is configured to perform the procedure which further comprises:

measuring a second distance from the second object provided on the second platform using the distance measuring system, and recording the measured second distance upon receipt of the fourth confirmation.

21. The surveying instrument according to claim 20, wherein the processing unit is configured to perform the procedure which further comprises:

measuring the fourth orientation using the orientation measuring system and recording the measured fourth orientation upon receipt of the fourth confirmation; and measuring the first orientation using the orientation measuring system and recording the measured first orientation upon receipt of the first confirmation.

22. The surveying instrument according to claim 18, wherein the processing unit is configured to perform the procedure which further comprises:

measuring the second orientation using the orientation measuring system and recording the measured second orientation upon receipt of the second confirmation; and measuring the third orientation using the orientation measuring system and recording the measured third orientation upon receipt of the third confirmation.

23. A surveying instrument comprising a processing unit configured to cause the surveying instrument to perform the surveying method according to claim 1.

24. A computer-readable carrier containing information representing a computer program adapted to cause a processing unit of a surveying instrument to execute the surveying method according to claim 1.

* * * * *